United States Patent [19]
Nishizaki et al.

[11] Patent Number: 6,146,569
[45] Date of Patent: Nov. 14, 2000

[54] APPARATUS FOR AND METHOD OF COLORING SHAPED PRODUCT OF SYNTHETIC RESIN

[75] Inventors: Tooru Nishizaki; Yoshihiro Kamata; Yasuhiro Ikeda; Yoshiaki Ootsuka, all of Kumamoto, Japan

[73] Assignee: Honda Giken Kogyo Kabushiki Kaisha, Tokyo, Japan

[21] Appl. No.: 09/124,158

[22] Filed: Jul. 28, 1998

[30] Foreign Application Priority Data

Aug. 1, 1997 [JP] Japan ................................ 9-207449

[51] Int. Cl.$^7$ .............................. B05D 3/06; B29C 35/16
[52] U.S. Cl. ........................ 264/129; 118/75; 264/237; 425/104; 427/401; 427/542
[58] Field of Search ............................ 425/94, 104, 105, 425/106; 264/129, 237; 118/323, 75; 427/401, 542

[56] References Cited

U.S. PATENT DOCUMENTS

| | | |
|---|---|---|
| 2,888,903 | 6/1959 | Faber . |
| 3,568,638 | 3/1971 | Isaac ...................... 118/323 |
| 4,102,964 | 7/1978 | Ridgeway ............... 264/46.8 |
| 4,943,680 | 7/1990 | Ellison et al. ........... 427/407.1 |
| 5,063,012 | 11/1991 | Gibbon .................... 264/129 |
| 5,208,081 | 5/1993 | Gubitz et al. ............ 264/241 |
| 5,428,879 | 7/1995 | Miller et al. ............ 425/403.1 |

FOREIGN PATENT DOCUMENTS

| | | |
|---|---|---|
| 528106 A1 | 6/1983 | European Pat. Off. ........ 425/94 |
| 58-101123 | 6/1983 | Japan . |
| 5-317804 | 12/1993 | Japan . |

*Primary Examiner*—Robert Davis
*Attorney, Agent, or Firm*—Carrier, Blackman & Associates, P.C.; Joseph P. Carrier; William D. Blackman

[57] ABSTRACT

A molding station for molding a colored product of a synthetic resin mixed with a colorant and a coating station for applying a colored clear coat to the surface of the molded colored product are disposed adjacent to each other for highly efficient production of colored clear coated, molded colored products. The molded colored product is charged directly from the molding station into the coating station. The hue of the molded colored product and the hue of the colored clear coat are seen as mixed to the eye. A plurality of hues may be available for each of the colorant and the colored clear coat, so that a variety of hues can be achieved on colored products by a combination of hues of the colorant and the colored clear coat without maintaining a large stock or inventory of different colorants or colored clear coats. The facility required to color the above products is relatively small in size, and the coloring processes are composed of a relatively small number of steps in comparison to conventional apparatus and methods.

10 Claims, 3 Drawing Sheets

APPARATUS FOR AND METHOD OF COLORING SHAPED PRODUCT OF SYNTHETIC RESIN

BACKGROUND OF THE INVENTION

1. Field of the Invention

The present invention relates to a technique of making an apparatus, for coloring a shaped product of synthetic resin for use on motor vehicle components or the like, small in size and reducing the number of steps of a coloring process for higher efficiency.

2. Description of the Related Art

FIG. 3 of the accompanying drawings shows a conventional process of manufacturing molded products of synthetic resin for use as motor vehicle components or the like. As shown in FIG. 3, a molded product is manufactured by a molding machine and then deburred, and thereafter carried from a molding line by a carriage or the like to a coating line separate from the molding line. In the coating line, the product is pretreated in preparation for a coating process, dried to remove water therefrom, and made electrically conductive. Then, an undercoat and an overcoat are applied to the product. After the coated product is dried to remove water therefrom, the product is discharged from the coating line by a carriage or the like.

The conventional process suffers various drawbacks as described below. Since the molding line and the coating line are separate from each other, after a molded product of a synthetic resin is produced, it needs to be transferred to a carriage and carried from the molding line to the coating line. Therefore, the entire facility for carrying out the process is relatively large, takes up a large installation space, and needs to be attended by many workers.

Furthermore, the coating line involves a number of steps and also requires a large amount of manpower for its operation. The coating line also needs to have as many coating paints as the number of desired colors, readily available for use.

SUMMARY OF THE INVENTION

It is therefore an object of the present invention to provide an apparatus for and a method of coloring shaped products efficiently through a relatively small number of steps at a small-size facility in a number of color hues without the need to increase the number of available coating colors.

To achieve the above object, there is provided in accordance with the present invention an apparatus for coloring a shaped product of a synthetic resin, comprising a molding station for molding a colored product of a synthetic resin mixed with a colorant, and a coating station disposed adjacent to the molding station, for applying a colored clear coat to the surface of the molded colored product charged directly from the molding station.

The molding station and the coating station are disposed adjacent to each other, and the molded colored product is charged directly from the molding station into the coating station without pretreatment between the two stations. Since the molded colored product does not need to be carried by a carriage from the molding station to the coating station, the apparatus may be relatively small in size and simple in structure.

There is also provided in accordance with the present invention a method of coloring a shaped product of a synthetic resin, comprising the steps of molding a colored product of a synthetic resin mixed with a colorant in a molding station, directly charging the molded colored product from the molding station into a coating station disposed adjacent to the molding station, and applying a colored clear coat to the surface of the molded colored product in the coating station.

Since the molded colored product is directly charged from the molding station into the adjacent coating station, the molded colored product does not need to be pretreated for a coating process. Therefore, the method is highly efficient to carry out. The coating process is highly simple because the molded colored product can be finished by the application of the colored clear coat as a single coat.

The molding station may have a molding machine comprising an injection molding machine, an extrusion molding machine, a blow molding machine, etc. Since the molded colored product is directly charged from the molding station into the adjacent coating station, the molding machine is preferably of such a design to mold colored products with less burrs and also to be able to cool molded colored products quickly.

The colored product may be molded according to any of a color compound process using a pelletized color compound which comprises a desired colorant and a synthetic resin that are mixed and kneaded together, or a premixing process using a mixture of a desired colorant and a synthetic resin that are mixed by a high-speed mixer, a tumbler, or the like and supplied to the injection-molding machine, or a mixing-type machine-based coloring process which automatically meters and blends a colorant and a synthetic resin with a metering device mounted on the injection molding machine and which also includes a mixing tank and supplies the blended mixture to a hopper of the injection molding machine, or a direct-charging-type machine-based coloring process which drops a liquid color onto a screw of the injection molding machine to disperse the liquid color in a synthetic resin.

Colorants that can be used may comprise dyes, pigments, or the like dispersed in a vehicle. The pigments of the colorants may be ordinary pigments exhibiting hues such as of red, blue, yellow, etc., pearly pigments, metallic pigments, fluorescent pigments, or other pigments.

Colored synthetic resins that can be used may include vinyl chloride, polyolefin, acrylic resin, polyamide, and others.

The transparency of the colored clear coat is such that it has a light transmittance for allowing the color of the colored product to be visible through the colored clear coat and also for allowing the color of the colored product and the color of the colored clear coat to be seen as a mixed hue to the eye.

The colored clear coat may comprises a highly transparent film-forming synthetic resin with a colorant dispersed therein. A plurality of colorants of different hues may be employed which include ordinary hues such as of red, blue, yellow, etc., and other special hues such as pearly hues, metallic hues, fluorescent hues, etc.

A plurality of hues may be available for each of the colorant and the colored clear coat, so that a variety of hues can be achieved on colored products by a combination of hues of the colorant and the colored clear coat.

Because the color of the colorant and the color of the colored clear coat applied thereto appear as mixed to the eye, a large number of different hues are available for final products by using different color combinations of the colorant and the colored clear coat, and hence the number of colorants that should be kept in stock for ready use may be relatively small.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENT

An apparatus for and a method of coloring shaped products according to the preferred embodiment of the present invention have been applied for manufacturing molded products of synthetic resin of motor vehicle components. With the apparatus and the method according to the present invention, it is possible to make a facility to color small in size, and to express a variety of colors without the need to increase the kinds or numbers of colorants that are available.

Figure 1:
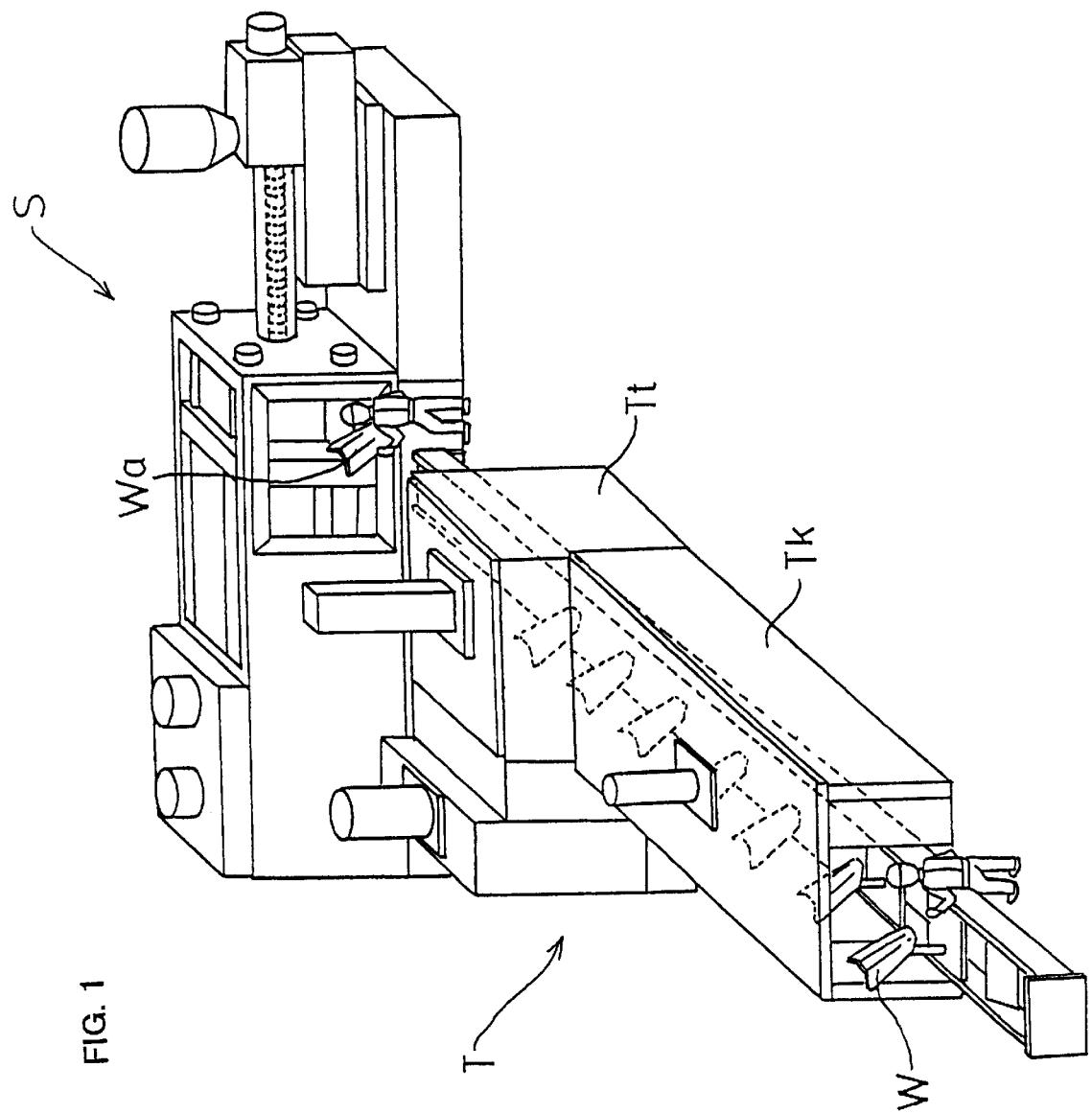
FIG. 1 is a schematic perspective view of a facility for coloring a molded product of synthetic resin according to a preferred embodiment of the present invention.

As shown in FIG. 1, a coloring apparatus according to the present invention comprises a molding station S having an injection molding machine for injection-molding products and a coating station T for coating molded products supplied from the molding station S, the molding station S and the coating station T being positioned adjacent to each other. The coating station T comprises a coating booth Tt having an unmanned coating robot for coating molded products and a drying furnace Tk for drying and hardening applied coats on coated products.

The injection molding machine of the molding station S injection-molds a colored product Wa of any of various colored synthetic resins including vinyl chloride, polyolefin, acrylic resin, polyamide, and others.

Those synthetic resins are uniformly colored in their entirety by colorants containing dyes, pigments, etc. which are kneaded in the synthetic resins. The colorants may be either dry colors each comprising a mixture of a pigment and a vehicle, or granular colors containing colorants such as dry colors and a special additive added thereto, or paste colors containing pigments dispersed in a vehicle such as a plasticizer or the like at a high density, liquid colors each comprising a pigment, an organic liquid, a vehicle, etc., or any other coloring materials.

The colored product Wa may be molded according to any of a color compound process using a pelletized color compound which comprises a desired colorant and a synthetic resin that are mixed and kneaded together, or a premixing process using a mixture of a desired colorant and a synthetic resin that are mixed by a high-speed mixer, a tumbler, or the like and supplied to the injection-molding machine, or a mixing-type machine-based coloring process which automatically meters and blends a colorant and a synthetic resin with a metering device mounted on the injection molding machine and which includes a mixing tank and supplies the blended mixture to a hopper of the injection molding machine, or a direct-charging-type machine-based coloring process which drops a liquid color onto a screw of the injection molding machine to disperse the liquid color in a synthetic resin.

The colorants may comprise dyes, pigments, or the like dispersed in a vehicle. The pigments of the colorants may be ordinary pigments exhibiting hues such as of red, blue, yellow, etc., pearly pigments, metallic pigments, fluorescent pigments, or other pigments.

The molding station S keeps in stock a plurality of colorants or color compounds readily available for molding colored products Wa of various hues.

When colored products Wa are injection-molded by the injection molding machine, the colored products Wa are successively deburred and then directly charged by a worker, for example, into the coating station T without being pretreated in preparation for a coating process.

The injection molding machine is preferably designed to mold colored products Wa with less burrs, and also to use a synthetic resin that can be melted at a low temperature and increase its cooling capability with a coolant gas so that colored products Wa will quickly be cooled.

In the coating station T, a colored clear coat is applied to each colored product Wa by the unmanned coating robot in the coating booth Tt.

The colored clear coat comprises a highly transparent film-forming synthetic resin with a colorant dispersed therein. The coating booth Tt keeps in stock a plurality of colorants of different hues which include ordinary hues such as of red, blue, yellow, etc., and other special hues such as pearly hues, metallic hues, fluorescent hues, etc.

The transparency of the colored clear coat is such that it has a light transmittance for allowing the color of the colored product Wa to be visible through the colored clear coat and also for allowing the color of the colored product Wa and the color of the colored clear coat to be seen as a mixed hue to the eye.

After the colored clear coat is applied as a single coat to the colored product Wa, the colored product Wa is delivered into the drying chamber Tk which has a low-temperature, short-time hardening system. In the drying chamber Tk, the applied colored clear coat is hardened in a short time by exposure to a far-infrared radiation or near-infrared radiation. The dried colored product Wa is then discharged as a final product W from the drying chamber Tk.

Figure 2:
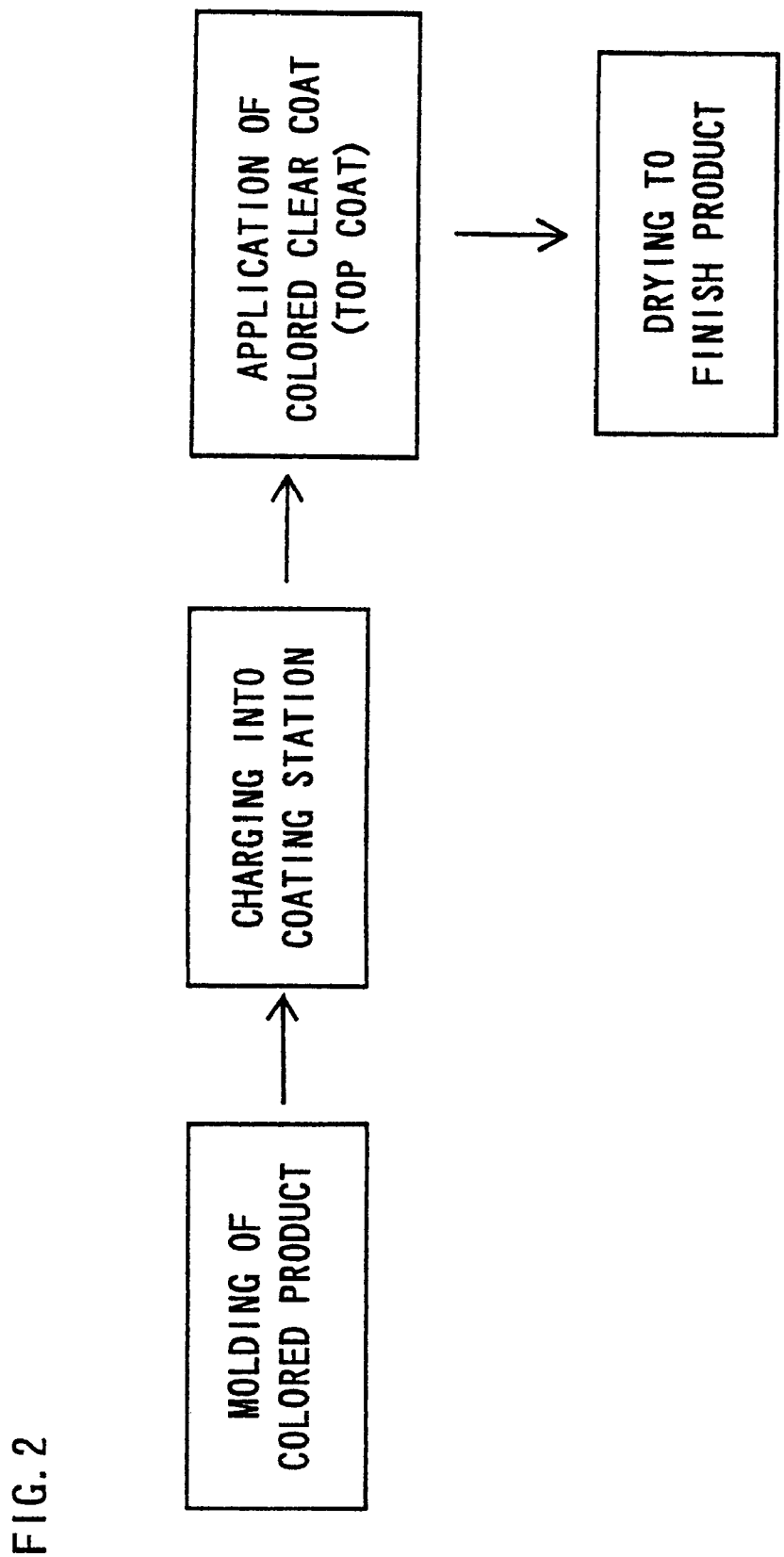
FIG. 2 is a flowchart of a process of coloring a molded product of synthetic resin according to a preferred embodiment of the present invention.
Figure 3:
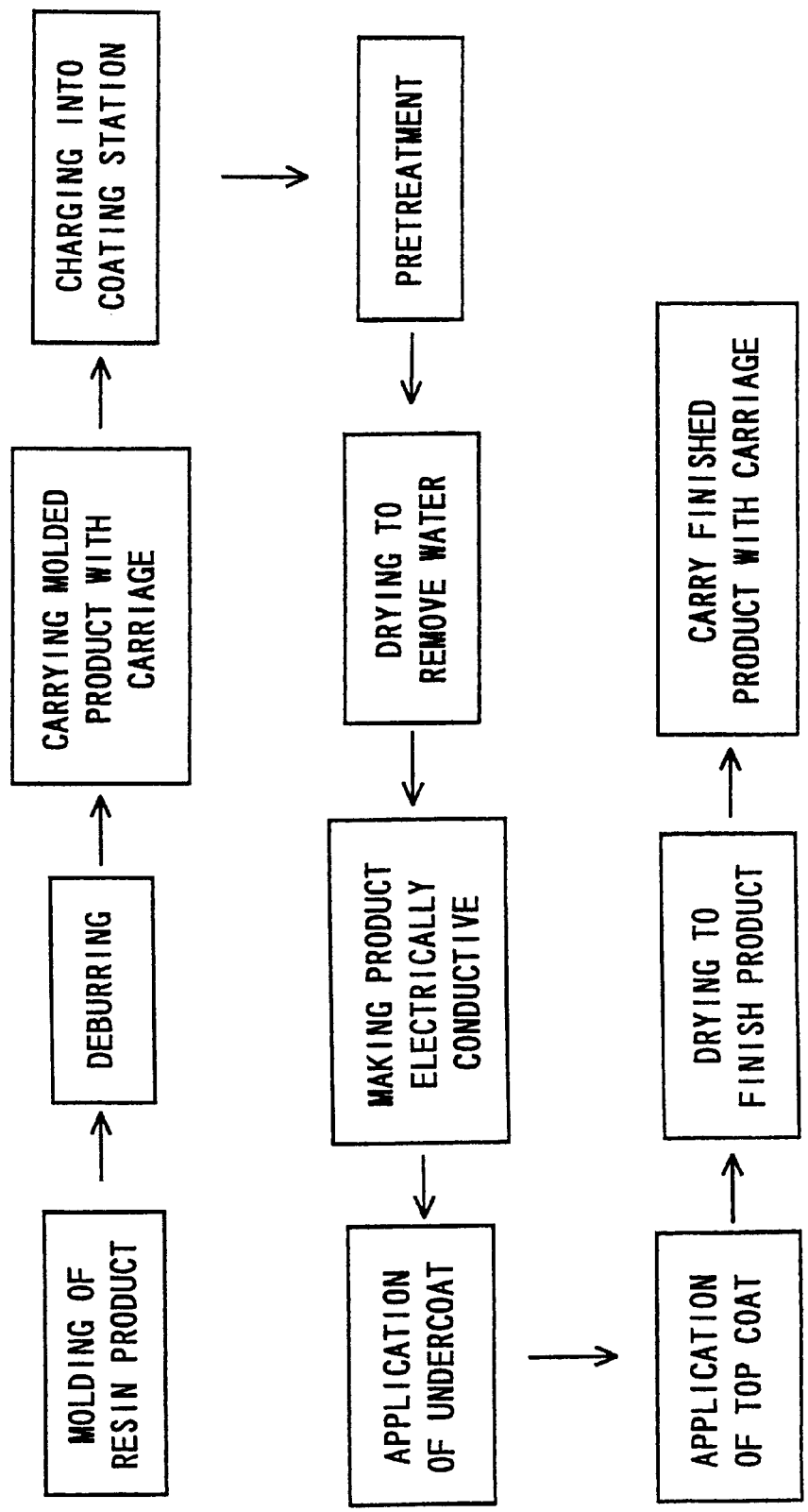
FIG. 3 is a flowchart of a conventional process of coloring a molded product of synthetic resin.

The above coloring process carried out by the coloring apparatus according to the present invention is summarized with reference to FIG. 2 as follows:

As shown in FIG. 2, a colored product Wa is injection-molded by the molding station S, and then charged into the coating station T. In the coating station T, a single colored clear coat is applied to the colored product Wa, and then dried and hardened, thereby producing a final product W. Consequently, the number of steps involved in the coloring process is much smaller than the number of steps of the conventional coloring process as shown in FIG. 3. The coloring apparatus shown in FIG. 1 is correspondingly much smaller in size than the facility required to carry out the conventional coloring process.

Because the color of the colored product Wa and the color of the colored clear coat applied thereto appear as mixed to the eye, a large number of different hues are available for final products W by using different color combinations of the colorant and the colored clear coat, and hence the number of colorants that should be kept in stock for ready use may be relatively small.

The molding station S shown in FIG. 1 may have an extrusion molding machine or a blow molding machine rather than the injection molding machine, or any of various other molding machines.

The molded products of synthetic resin which can be colored may be components other than motor vehicle components.

Although a certain preferred embodiment of the present invention has been shown and described in detail, it should be understood that various changes and modifications may be made therein without departing from the scope of the appended claims.

What is claimed is:

1. An apparatus for coloring a shaped product of a synthetic resin, comprising:

a molding station for molding a colored product of a synthetic resin mixed with a colorant; and a coating station disposed adjacent to said molding station, for applying a colored clear coat to the surface of the molded colored product charged immediately from said molding station;

said molding station being adapted to mold the colored product with synthetic resin that can be melted at low temperature, and including means for cooling the molded product with a coolant gas;

said coating station including a coating booth for coating molded products and a drying chamber for drying and hardening applied coats on coated products; and said drying chamber being a low temperature, short-term hardening system including a source of at least one of far-infrared radiation and near-infrared radiation.

2. A method of coloring a shaped product of a synthetic resin, comprising the steps of:

molding a colored product of a synthetic resin mixed with a colorant in a molding station;

cooling the molded product with a coolant gas in the molding station;

directly charging the molded colored product from the molding station into a coating station disposed adjacent to said molding station; and applying a colored clear coat to the surface of the molded colored product in said molding station; and drying and hardening the applied colored clear coat in said coating station, said drying and hardening step being a low temperature, short-term step involving use of at least one of far-infrared radiation and near-infrared radiation.

3. A method according to claim 2, wherein a plurality of hues are available for each of the colorant and the colored clear coat, so that a variety of hues can be achieved on colored products by a combination of hues of the colorant and the colored clear coat.

4. A coloring apparatus according to claim 1, wherein said molding station includes at least one of an injection molding machine, an extrusion molding machine and a blow molding machine for molding the colored product, and a stock of a plurality of colorants or color compounds for molding colored products of various hues.

5. A coloring apparatus according to claim 1, wherein said coating booth includes a coating robot.

6. A coloring apparatus according to claim 1, wherein said coating station is adapted to receive and coat the molded colored product directly from said molding station without pretreatment of the product between the stations.

7. A method according to claim 2, further including a step of deburring the molded product before it is directly charged from the molding station into the coating station.

8. A method according to claim 2, wherein said synthetic resin has a low melting temperature.

9. A method according to claim 2, wherein said applying step involves applying said colored clear coat as a single coat to the surface of said molded colored product.

10. A method according to claim 2, wherein said molding station includes a plurality of colorants of different hues for use in molding the colored product, said coating station includes a plurality of colorants of different hues for use in forming the colored clear coat, and said molding and coating steps involve selection of specific ones of the colorants used therein for achieving a desired final color of the clear coated, molded colored product.

* * * * *

UNITED STATES PATENT AND TRADEMARK OFFICE
CERTIFICATE OF CORRECTION

PATENT NO : 6,146,569
DATED : 14 November 2000
INVENTOR(S): T. Nishizaki, Y. Kamata, Y. Ikeda, Y. Ootsuka It is certified that error appears in the above-identified patent and that said Letters Patent are hereby corrected as shown below:

Column 2, 31st line, after "machine" insert a comma.

Column 3, line 62, after "machine" insert a comma.

Column 4, line 53, after "process" insert a comma.

Signed and Sealed this

First Day of May, 2001

Attest:

NICHOLAS P. GODICI

Attesting Officer

Acting Director of the United States Patent and Trademark Office